(12) United States Patent
Hasegawa (10) Patent No.: US 9,427,866 B2
(45) Date of Patent: Aug. 30, 2016

(54) GEAR MECHANISM, SPEED REDUCER, AND ROBOT ARM

(71) Applicant: CANON KABUSHIKI KAISHA, Tokyo (JP)

(72) Inventor: Masahide Hasegawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 14/422,881

(22) PCT Filed: Sep. 20, 2013

(86) PCT No.: PCT/JP2013/076446
§ 371 (c)(1),
(2) Date: Feb. 20, 2015

(87) PCT Pub. No.: WO2014/051131
PCT Pub. Date: Apr. 3, 2014

(65) Prior Publication Data
US 2015/0224642 A1    Aug. 13, 2015

(30) Foreign Application Priority Data

Sep. 25, 2012  (JP) .................................. 2012-210920

(51) Int. Cl.
| | | |
|---|---|---|
| *F16H 1/12* | (2006.01) | |
| *F16H 1/32* | (2006.01) | |
| *B25J 9/10* | (2006.01) | |

(52) U.S. Cl.
CPC ................. *B25J 9/102* (2013.01); *B25J 9/104* (2013.01); *F16H 1/12* (2013.01); *F16H 1/321* (2013.01); *Y10S 901/25* (2013.01); *Y10T 74/1966* (2015.01)

(58) Field of Classification Search
CPC ............ F16H 1/12; F16H 1/321; B25J 9/102
See application file for complete search history.

(56) References Cited

U.S. PATENT DOCUMENTS

| | | | | |
|---|---|---|---|---|
| 4,041,808 | A * | 8/1977 | Fickelscher ............. | F16H 1/321 475/163 |
| 8,210,070 | B2 * | 7/2012 | Takahashi ............... | F16H 1/321 475/163 |
| 2015/0024896 | A1 * | 1/2015 | Takahashi ................ | F16H 1/32 475/162 |

FOREIGN PATENT DOCUMENTS

| | | |
|---|---|---|
| JP | S44-002373 B | 1/1969 |
| JP | S45-012664 U | 6/1970 |
| JP | S54-120347 A | 9/1979 |
| WO | 2011-154981 A | 12/2011 |
| WO | 2011/155071 A | 12/2011 |

OTHER PUBLICATIONS

International Preliminary Report on Patentability issued in Patent Application No. PCT/JP2013/076446, dated Apr. 9, 2015.
U.S. Appl. No. 14/600,267 to inventor Masahide Hasegawa, filed Jan. 20, 2015.
U.S. Appl. No. 14/601,728 to inventor Masahide Hasegawa, filed Jan. 21, 2015.

* cited by examiner

*Primary Examiner* — Tisha Lewis
(74) *Attorney, Agent, or Firm* — Fitzpatrick, Cella, Harper & Scinto (57) ABSTRACT

A gear mechanism, including: a first gear; and a second gear. The first gear and the second gear are arranged at an inclination angle to form a first meshing region and a second meshing region. Multiple tooth tip portions of the first gear and multiple tooth tip portions of the second gear are each formed to be held in contact with each other at one point in the first meshing region. Multiple recessed portions of the first gear and multiple recessed portions of the second gear are each formed to conform to a passing region extending along movement of one of the multiple mating tooth tip portions at the time of moving in the second meshing region.

7 Claims, 10 Drawing Sheets

GEAR MECHANISM, SPEED REDUCER, AND ROBOT ARM

TECHNICAL FIELD

The present invention relates to a gear mechanism, a speed reducer, and a robot arm, and more particularly, to a gear mechanism, to be used in a speed reducer of each joint of a robot arm.

BACKGROUND ART

In general, industrial robots use a speed reducer to convert high-speed low torque that is output from a drive motor into low-speed high torque for driving their joints. As the speed reducer used therefor, there has been known a strain wave gearing that utilizes differential motions of an ellipse and a perfect circle. In the strain wave gearing, a large number of teeth mesh with each, other at a time, and hence a high torque capacity can be obtained. Due to this advantage, the strain wave gearing is used in various industrial robots. However, the strain wave gearing has disadvantages of high cost and poor durability due to utilization of deformation.

Besides, as the speed reducer, an oscilating gearing that provides a high reduction gear ratio by using a rocking movement of a rocking gear therein is also generally used. In the oscilating gearing, a fixed, gear is provided coaxially with an input shaft, and the rocking gear having a different number of teeth is inclined by the input shaft and meshed with the fixed gear. The rocking movement is performed by rotation of the input shaft. At this time, the rocking gear revolves per rotation of the input shaft by an amount corresponding to a difference in number of teeth, and hence only a component of the revolution is transmitted to an output shaft. In this way, speed reduction is performed (PTL 1). Further, in another example, speed reduction is performed not by transmission of the component of the revolution bar by differential motions of a pair of the fixed gear and an output gear that is provided opposite thereto, and a pair of the output gear and the rocking gear that is meshed with the output gear (PTL 2).

CITATION LIST

Patent Literature

PTL 1: Japanese Patent Application Laid-Open No. S44-002373
PTL 2: Japanese Patent Application Laid-Open No. S54-120347

SUMMARY OF INVENTION

Technical Problems

Incidentally, in many cases, gears of those oscilating gearings have a general involute tooth profile, and in those cases, the number of teeth to mesh with each other is difficult to increase. Thus, there is a problem in that the oscilating gearings are not suited to a speed reducer that requires a high rigidity and a high torque capacity so as to be used, for example, in joint actuators for industrial robots. Further, when a conventional tooth profile having a large number of teeth to mesh with each other is applied to the oscilating gearings, a high pressure angle formed due to the tooth profile causes problems in that a contact pressure that is relatively high with respect to torque is generated, and that efficiency in torque transmission is deteriorated and a support member is upsized even though a rigidity can be increased.

In view of such circumstances, it is an object of the present invention to provide a gear mechanism capable of achieving a high rigidity and a high torque capacity without being upsized, and a robot arm including the gear mechanism.

Solution to Problems

According to one embodiment of the present invention, there is provided a gear mechanism, including: a first gear having an annular tooth surface including: multiple tooth tip portions formed on a distal end side with respect to a predetermined height; and multiple recessed portions formed on a tooth root side with respect to the predetermined height at positions between the multiple tooth tip portions, respectively; and a second gear having an annular tooth surface including: multiple tooth tip portions formed on a distal end side with respect to the predetermined height; and multiple recessed portions formed on a tooth root side with respect to the predetermined height at positions between the multiple tooth tip portions, respectively, the multiple tooth tip portions of the second gear and the multiple recessed portions of the second gear being respectively larger in number than the multiple tooth tip portions of the first gear and the multiple recessed portions of the first gear. The first gear and the second gear are arranged under a state in which a rotation axis of the first gear and a rotation axis of the second gear are inclined at a predetermined angle so as to set a deepest meshing position at which one of the multiple tooth tip portions of one of the first gear and the second gear and corresponding one of the multiple recessed portions of another of the first gear and the second gear mesh most deeply with each other, and a grazing position at which the one of the multiple tooth tip portions of the one of the first gear and the second gear and corresponding one of the multiple tooth tip portions of the another of the first gear and the second gear graze each other on an opposite side of the deepest meshing position, and to form a first meshing region in which the one of the multiple tooth tip portions of the one of the first gear and the second gear and the corresponding one of the multiple tooth tip portions of the another of the first gear and the second gear are held in contact with each other on each, of both sides of the grazing position, and a second meshing region in which the one of the multiple tooth tip portions of the one of the first gear and the second gear and the corresponding one of the multiple recessed portions of the another of the first gear and the second gear are held in contact with each other on the deepest meshing position side with respect to the first meshing region. The multiple tooth tip portions of the first gear and the multiple tooth tip portions of the second gear are each formed to be held in contact with each other at one point in the first meshing region. The multiple recessed portions of the first gear and the multiple recessed portions of the second gear are each formed to conform to a passing region extending along movement of one of the multiple mating tooth tip portions at the time of moving in the second, meshing region.

Advantageous Effects of Invention

According to one embodiment of the present invention, the number of teeth to mesh with each other can be increased with tooth profiles that enable the teeth to be held in contact with each other substantially over the entire peripheries thereof. Thus, the gear mechanism capable of achieving a high rigidity and a high torque capacity without being upsized, and the robot arm including the gear mechanism, can be provided.

Further features of the present invention will become apparent from the following description of exemplary embodiments with reference to the attached drawings.

BRIEF DESCRIPTION OF DRAWINGS

FIGS. 2A and 2B are explanatory views of a speed reducer according to the first embodiment.

DESCRIPTION OF EMBODIMENTS

First Embodiment

Figure 1:
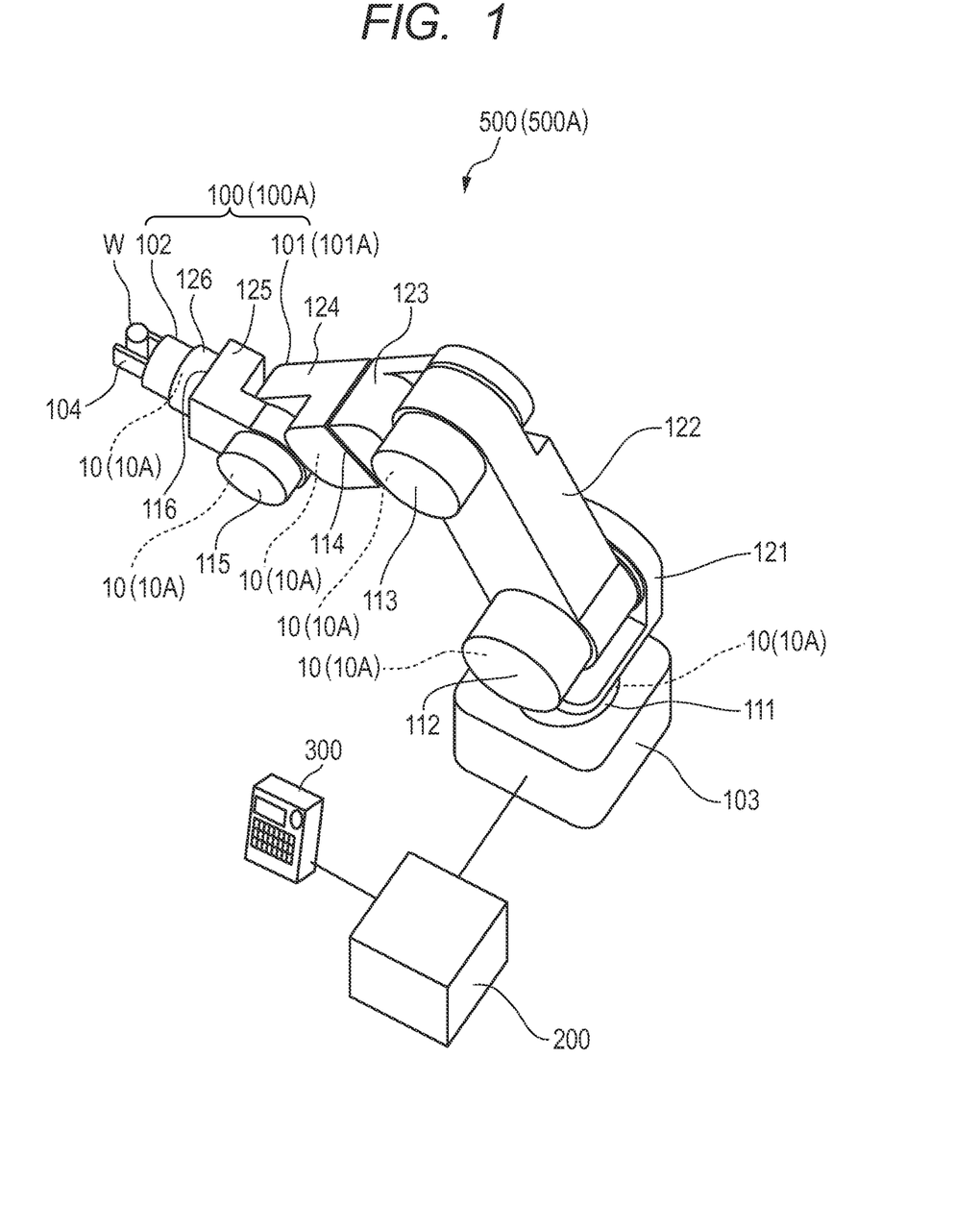
FIG. 1 is a perspective view of a schematic structure of a robot device according to a first embodiment of the present invention.

In the following, a robot device 500 according to a first embodiment of the present invention is described with reference to FIGS. 1 to 6D. First, a schematic structure of the robot device 500 according to the first embodiment is described with reference to FIG. 1. FIG. 1 is a perspective view of the schematic structure of the robot device 500 according to the first embodiment of the present invention.

As illustrated in FIG. 1, the robot device 500 is an industrial robot, and includes an articulated robot 100 for performing operations such as assembly of a workpiece W, a control unit 200 for controlling the articulated robot 100, and a teaching pendant 300 connected to the control unit 200.

The articulated robot 100 includes a six-axis articulated robot arm 101, and an end effector 102 connected to a distal end of the robot arm 101.

The robot arm 101 includes a base portion 103 fixed to a work table, multiple links 121 to 126 for transmitting displacement and a force, and multiple joints 111 to 116 for coupling the multiple links 121 to 126 in a turnable or rotatable manner, respectively. The multiple joints 111 to 116 each include a drive motor (not shown), an encoder (not shown) for detecting a rotation angle of a rotary shaft of the drive motor, and a speed reducer 10 for reducing output of the drive motor so as to increase torque of the drive motor. Note that, the drive motor and the speed reducer 10 serve as an actuator, and the speed reducer 10 is described in detail below.

The end effector 102 includes gripping claws 104 for gripping the workpiece W, a drive motor (not shown) for driving the gripping claws 104, an encoder (not shown) for detecting a rotation angle of a rotary shaft of the drive motor, and a speed reducer (not shown) for reducing output of the drive motor. Further, the end effector 102 includes a force sensor (not shown) capable of detecting stress (repulsive force) applied to the gripping claws 104 and the like.

The teaching pendant 300 is capable of receiving instructions to drive and control the robot arm 101 and the end effector 102. Based on a setting and the like input via the teaching pendant 300, and on various programs and the like stored in a storage unit (not shown), the control unit 200 drives and controls the robot arm 101 and the end effector 102.

In the robot device 500 structured as described above, based on the input setting and the like, the control unit 200 drives the respective drive motors of the multiple joints 111 to 116 of the robot arm 101 while reducing rpms thereof so as to move the end effector 102 to an arbitrary three-dimensional position. Then, at the arbitrary three-dimensional position, the workpiece W or a component is gripped by the end effector 102 while detecting the stress applied to the gripping claws 104 by the force sensor. In this way, the operations such as the assembly of the workpiece W are performed.

Figure 2A:
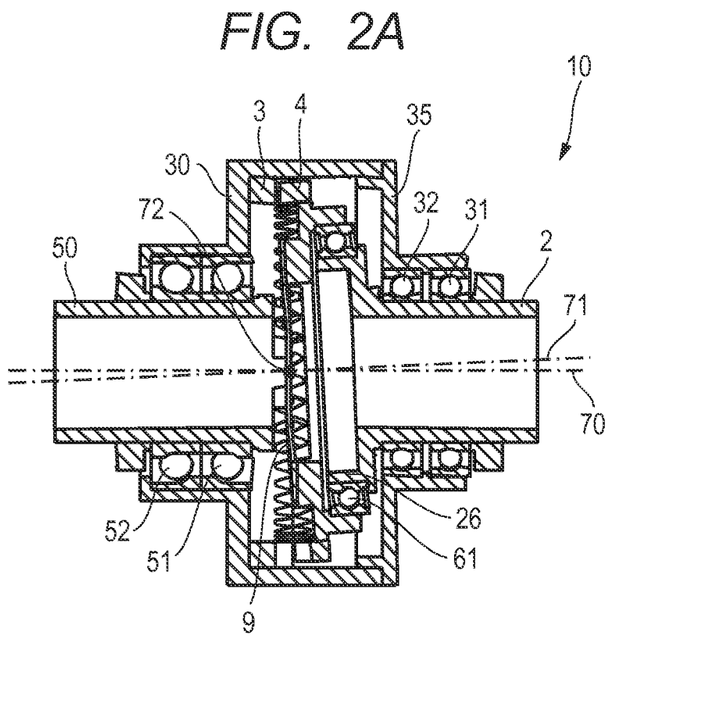
FIG. 2A is an axial sectional view of the speed reducer.
Figure 2B:
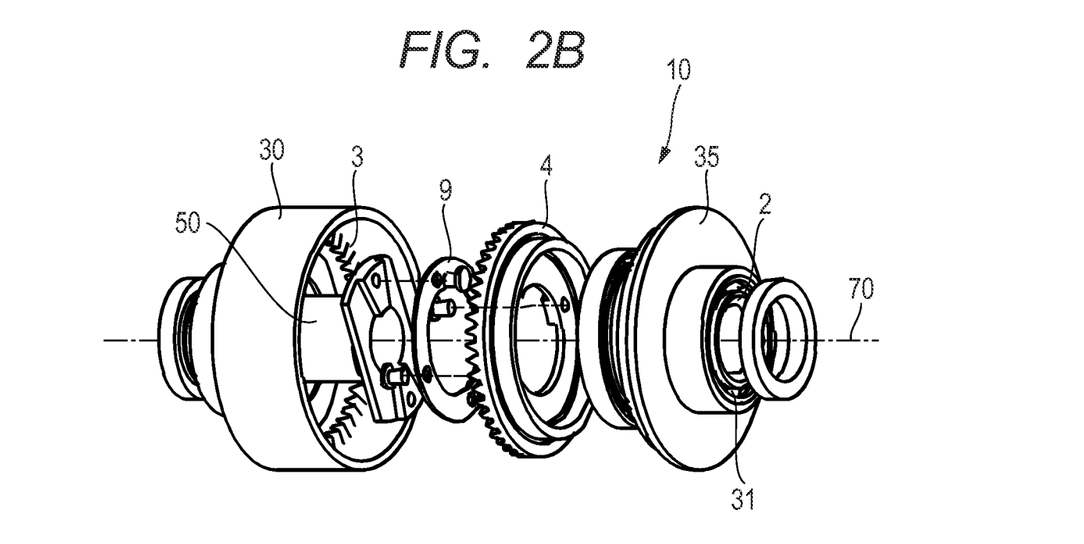
FIG. 2B is an exploded perspective view of the speed reducer.
Figure 3A:
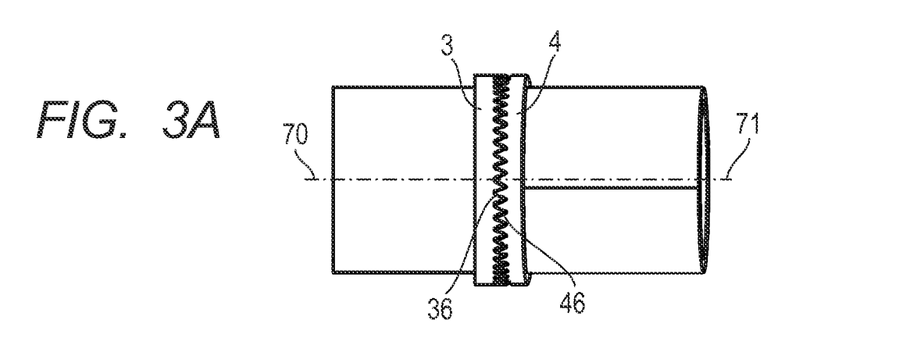
FIGS. 3A, 3B and 3C are views of a speed reduction gearing of the speed reducer according to the first embodiment.
Figure 3B:
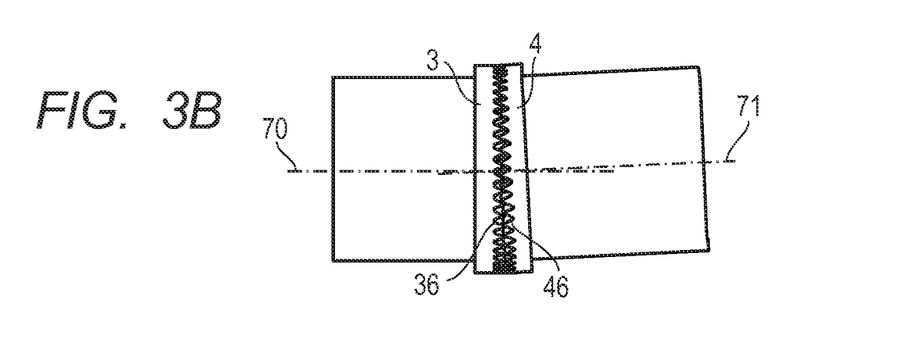
Figure 3C:
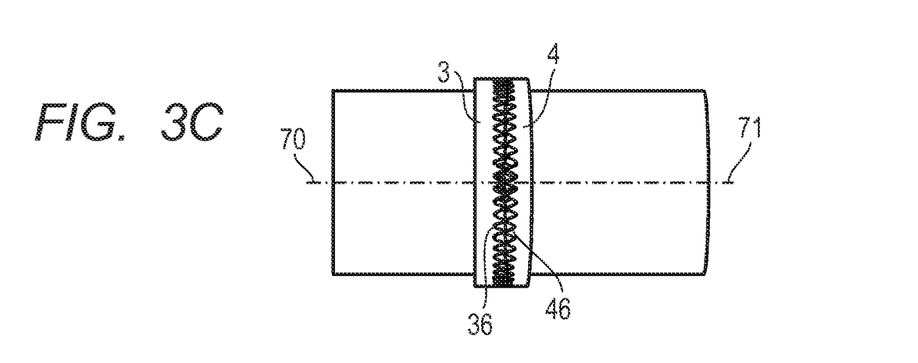

Next, the speed reducer 10 according to the first embodiment is described with reference to FIGS. 2A to 6D. First, a schematic structure of the speed reducer 10 is described with reference to FIGS. 2A to 3C. FIGS. 2A and 2B are explanatory views of the speed reducer 10 according to the first embodiment. FIG. 2A is an axial sectional view of the speed reducer 10, and FIG. 2B is an exploded perspective view of the speed reducer 10. FIGS. 3A to 3C are views of a speed reduction gearing of the speed reducer 10 according to the first embodiment.

As illustrated in FIGS. 2A and 2B, the speed reducer 10 includes an input shaft 2 connected to the drive motor, and an output, shaft 50 connected to corresponding one of the multiple links 121 to 126. Rotation input from the drive motor is transmitted at a lower rpm through intermediation of the speed reducer 10 to corresponding one of the multiple links 121 to 126. The input shaft 2 is supported in a pivotal manner in a second case 35 through intermediation of bearings 31 and 32, and the output shaft 50 is supported in a pivotal manner in a first case 30 through intermediation of bearings 51 and 52 so as to be coaxial with the input shaft 2.

Further, the speed reducer 10 includes a first gear 3 provided with Z teeth and formed to have an annular tooth surface, and a second gear 4 provided with Z+1 teeth (difference n in number of the teeth between the first gear 3 and the second gear 4 is one) and formed to have an annular tooth surface. The annular tooth surface of the first gear 3 includes multiple tooth tip portions formed on a distal end side with respect to a predetermined height, and multiple recessed portions formed on a tooth root side with respect to the predetermined height at positions between the tooth tip portions, respectively, and the first gear 3 itself is fixed to the first case 30. The annular tooth surface of the second gear 4 includes tooth tip portions formed on a distal end side with respect to the predetermined height, and recessed portions formed on a tooth root side with respect to the predetermined height at positions between the tooth tip portions, respectively. The tooth tip portions and the recessed portions are respectively larger in number than those of the first gear 3. Further, in mesh with the first gear 3 at a predetermined inclination angle, the second gear 4 is supported in a pivotal and freely rotatable manner through intermediation of a bearing 61 by an inclined shaft portion 26 provided to the input shaft 2. Further, the second gear 4 is connected to the output shaft 50 under a preload applied from a flexible joint mechanism using a leaf spring 9 so as to transmit only a meshing revolution component to the output shaft 50 while preventing backlash.

The first gear 3 and the second gear 4 are arranged under a state in which a rotation axis of the first gear 3 and a rotation axis of the second gear 4 are inclined at a predetermined angle so as to set a deepest meshing position at which the tooth tip portion and the recessed portion mesh most deeply with each other and a grazing position at which the tooth tip portions graze each other on an opposite side of the deepest meshing position. The first gear 3 and the second gear 4 are also arranged at the predetermined inclination angle so as to form a first meshing region in which the tooth tip portions are held in contact with each other on both sides of the grazing position, and a second meshing region in which the tooth tip portion on one side and the recessed, portion on another side are held in contact with each other on the deepest meshing position side with, respect to the first meshing region.

Specifically, meshing positions between teeth 36 of the first gear 3 and teeth 46 of the second gear 4 are arranged out of phase with each other by a half pitch. In a reference phase (deepest meshing position) illustrated in FIG. 3A, the tooth 36 of the first gear 3 and the tooth 46 of the second gear 4 mesh deeply with each other out of phase by a half pitch. Further, at a position of approximately ±90 degrees with respect to the reference phase (boundary position between the first meshing region and the second, meshing region) illustrated in FIG. 3B, the tooth 36 of the first gear 3 and the tooth 46 of the second gear 4 loosely mesh with each other out of phase by a ¼ pitch (for example, the tooth tip portions are held in contact with each other at one point).

Further, at a position of ±180 degrees with respect to the reference phase (grazing position) illustrated in FIG. 3C, the tooth 36 of the first gear 3 and the tooth 46 of the second gear 4 are in-phase with each other, and distal ends of the tooth tip portions are held in contact with each other. In a phase between the above-mentioned positions, the tooth 36 and the tooth 46 are gradually changed in phase with each other, and hence changed in meshing depth. With this, the teeth 36 of the first gear 3 and the teeth 46 of the second gear 4 are held in contact with each other substantially over the entire peripheries thereof.

Figure 4:
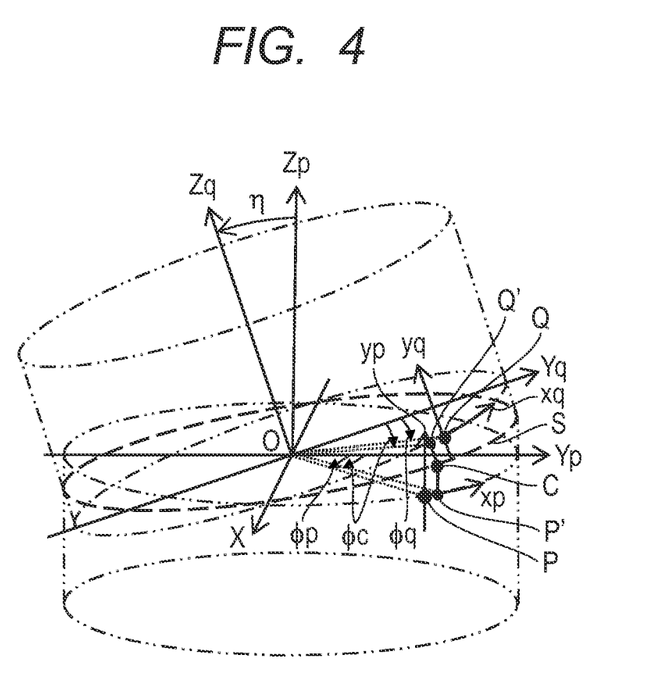
FIG. 4 is an explanatory view for calculating a projecting tooth profile curve of the speed reduction gearing.

Now, a principle that the teeth 36 of the first gear 3 and the teeth 46 of the second gear 4 as a mating member are held in contact with each other substantially over the entire peripheries of the first gear 3 and the second gear 4 is described with reference to FIG. 4. FIG. 4 is an explanatory view for calculating a projecting tooth profile curve of the speed reduction gearing.

As illustrated in FIG. 4, a Zp-axis corresponds to an input rotation axis 70 of the first gear 3, and a Zq-axis corresponds to an inclined rotation axis 71 of the second gear 4. The Zq-axis is inclined at an inclination angle $\eta$ with respect to the Zp-axis, and the origin O corresponds to a reference point 72, and a common X-axis extends in a direction orthogonal to a plane including the Zp-axis and the Zq-axis. In this way, an X-Yp-Zp coordinate system and an X-Yq-Zq coordinate system are set. In those coordinate systems, when the first gear 3 and the second gear 4 are considered as cylindrical planes each having a radius R, an intersecting line between those cylindrical planes corresponds to an ellipse S.

Next, there are considered points P and Q (also referred to as tooth reference points) that uniformly move clockwise respectively from positive sides of a Yp-axis and a Yq-axis on circumferences (also referred to as reference pitch circles) each having the radius R respectively in an X-Yp plane and an X-Yq plane, a point C that moves on the ellipse S, and points P' and Q' as feet of perpendicular lines from the point C respectively to the X-Yp plane and the X-Yq plane. When the first gear 3 is provided with the Z teeth, and the second gear 4 is provided with Z+n teeth (difference in number of teeth n=1), a phase of the point P can be expressed by $\phi p = 2\pi t/Z$ (t: parameter), and a phase of the point Q can be expressed by $\phi q = 2\pi t/(Z+1)$ (t: parameter).

In this case, phases of points P' and Q' are each expressed by $\phi c = 2\pi t/(Z+1/2)$. In an xp-yp moving coordinate system and an xq-yq moving coordinate system with the points P and Q as origins in the respective cylindrical planes, trajectories of the point C in those coordinate systems are expressed as follows: $(2\pi t/(Z(Z+1/2)), R \tan(\eta/2)\cos(2\pi t/(Z+1/2)))$ and $(-2\pi t/((Z+1)(Z+1/2)), -R \tan(\eta/2)\cos(2\pi t/(Z+1/2)))$, in other words, $yp = R \tan(\eta/2) \cos(xpZ)$ and $yq = -R \tan(\eta/2) \cos(xq(Z+1))$. When the first gear 3 and the second gear 4 have tooth profiles expressed by those expressions, the first gear 3 and the second gear 4 can be held in continuous contact with each other from the point C as a meshing point. In other words, the teeth 36 of the first gear 3 and the teeth 46 of the second gear 4 can be held in contact with each other substantially over the entire peripheries thereof.

Next, a principle that a tooth tip portion 36a of each of the teeth 36 of the first gear 3 and a recessed portion 46b of each of the teeth 46 of the second gear 4 are held in contact with each other is described with reference to FIGS. 5A to 5E. FIGS. 5A to 5E are views illustrating how the tooth tip portion 36a and the recessed portion 46b of the speed reduction gearing mesh with each other.

When the tooth profiles of the first gear 3 and the second gear 4 are formed as described above, as illustrated in FIG. 5A, in phases corresponding to positive directions of both the Yp-axis and Yq-axis (grazing position), the tooth tip portion 36a and a tooth tip portion 46a are held in contact with each other only at a meshing point 81 as long as reference points (predetermined heights) 38 and 48 are located on their respective tooth root sides with respect to a height position corresponding to $R \tan(\eta/2)$. Then, along with rotation in an X-axis direction on both the sides of the grazing position, the tooth tip portions 36a and 46a shift in the first meshing region as illustrated in FIGS. 5B and 5C (the tooth tip portions 36a and 46a are held in contact with each other at one point). However, whereas the tooth tip portions 36a and 46a near the boundary position in the X-axis Direction (refer to FIG. 5C) each have a projection shape, according to the above-mentioned cosine functions, a recessed portion 36b and the recessed portion 46b on the tooth root side with respect to the boundary position each have a recessed shape, and hence interference occurs therebetween. As a countermeasure, in this embodiment, the meshing point 81 near the boundary position is set as a meshing reference point (reference position). A tooth profile curve of each of the recessed portions 36b and 46b on the tooth root side with respect to the meshing reference point corresponds to a curve calculated as an external tangent conforming to the trajectory along each of the tooth tip portions 36a and 46a on the distal end side with respect to the meshing reference point at the time of moving along the mating tooth tip portions 46a and 36a (recessed shape conforming to a passing region).

Figure 5A:
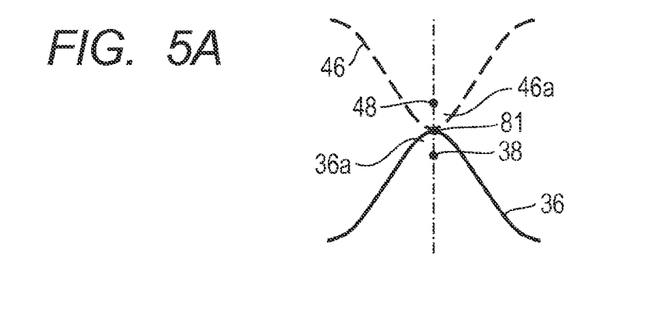
FIGS. 5A, 5B, 5C, 5D and 5E are views illustrating how a tooth tip portion and a recessed portion of the speed reduction gearing mesh with each other.
Figure 5B:
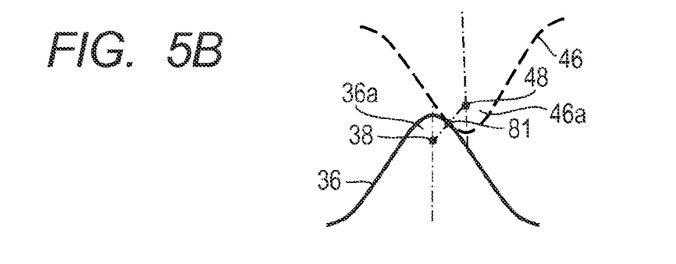
Figure 5C:
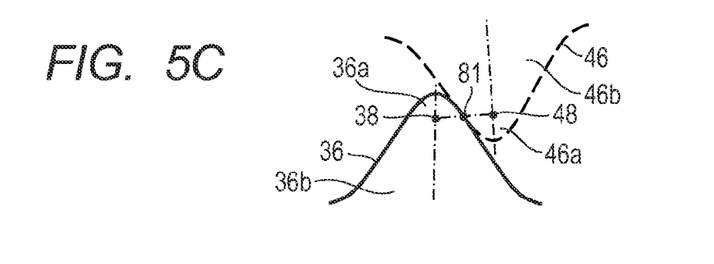
Figure 5D:
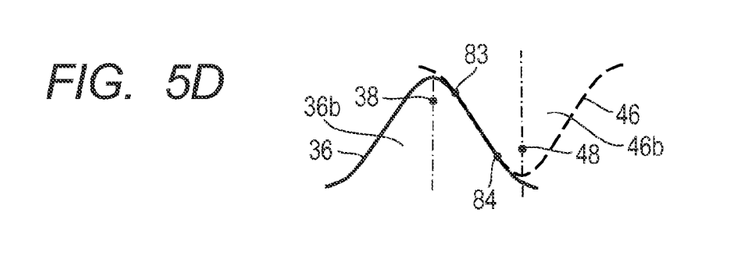
Figure 5E:
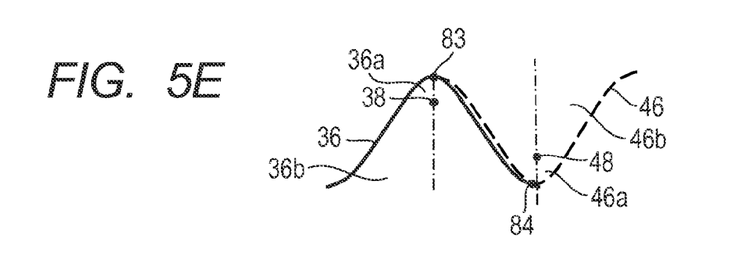

Thus, as illustrated in FIGS. 5D and 5E, with regard to meshing points in the second meshing region, the tooth tip portions 36a and 46a and the recessed portions 46b and 36b mesh respectively with each other, and hence the tooth tip portions 36a and 46a and the recessed portions 46b and 36b mesh simultaneously with each other at two points represented by contact points 83 and 84. Note that, in a strict sense, projecting tooth profiles of the tooth tip portions 36a and 46a of the two gears are not in the same cylindrical plane. Thus, when the projecting tooth profiles each correspond to a curved plane obtained by connecting the tooth profile curve and the origin to each other, a tooth profile of each of the recessed portions 36b and 46b on the tooth root side corresponds to an intersecting line between a circumscribed curved surface conforming to each of the projecting tooth profiles and corresponding one of the cylindrical planes.

In this way, when the first gear 3 and the second gear 4 of the gear mechanism according to this embodiment are held in contact with each other substantially over the entire peripheries thereof, torque to be transmitted is shared therebetween, and hence a significantly high load capacity can be obtained with a small-size and lightweight gear mechanism. Further, a pressure angle becomes lower in reverse proportion to the number of teeth Z and the inclination angle η, and hence an appropriate pressure angle can be set. Further, as illustrated in FIGS. 5A to 5E, tooth profile curves around the meshing reference point are each substantially a straight line. In particular, in the phase in which the gears mesh with each other more deeply with respect to the meshing reference point, the tooth tip portions and the recessed portions, specifically, projection surfaces and recessed surfaces mesh each other at two points, and hence a contact pressure is reduced. With this, tooth surface stress and abrasion of the tooth profiles are reduced.

Further, in phases near those illustrated in FIGS. 5A and 5E, the pressure angle is approximately 90 degrees, and hence torque is not transmitted efficiently. Thus, in order to prevent contact in certain ranges around those phases, any one of tooth tips and tooth roots, or both the tooth, tips and the tooth roots may be formed into a non-contact shape through trimming. The non-contact shape contributes to reduction in torque loss.

Still further, based on the above-mentioned expressions, tooth thicknesses of each of the first gear 3 and the second gear 4 at the meshing reference point are approximately ¼ of pitches 2π/Z and 2π/(Z+1) of the respective teeth of the first gear 3 and the second gear 4, and hence tooth strengths are substantially equal to each other. Thus, the torque can be applied with an optimum balance without restriction on a magnitude of a torque to be applied due to a lower strength of the teeth of any one of the first gear 3 and the second gear 4. Note that, the expression for calculating the phase angle φc of the point C, which is used for calculating the tooth profiles of the tooth, tip portions, is not limited to the above-mentioned expression. For example, when the phase angle φc is expressed by φc=(2Z+1)πt/(Z(Z+1)), expressions yp=R tan(η/2)cos(xp(Z+½)) and yq=−R tan(η/2)cos(xq(Z+½)) are established. With this, the tooth thicknesses of both the gears at the meshing reference point can be set to be equal to each other. Alternatively, it suffices that the phases of the teeth of both the gears are continuous with each other as expressed by φp>φc>φq.

In the case described above, the difference n in number of the teeth is one. However, also when the difference n in number of the teeth is set to two, a gear mechanism in which the gears mesh with each other continuously over a range of, for example, ±180/n degrees can be obtained. Note that, when the difference n in number of the teeth is large, the number of teeth to mesh with each other is equal to those of normal gear mechanisms. Thus, the difference n in number of the teeth is preferably one or two.

Next, a speed reducing operation by the speed reducer 10 having the gear mechanism described above is described also with reference to FIGS. 2A and 2B. First, when the input shaft 2 performs a single rotation, the inclined shaft portion 26 is rotated about the input rotation axis 70, and the second gear 4 performs a single rocking motion about the reference point 72 corresponding to an intersection between the inclined rotation axis 71 and the input rotation axis 70. At this time, the second gear 4 performs a single revolution at an angle corresponding to the difference in number of the teeth between the first gear 3 and the second gear 4. In other words, when the input shaft 2 performs Z+1 rotations, the second gear 4 performs a single revolution. In this way, the output shaft 50 performs a single rotation through intermediation of the flexible joint mechanism, and hence a reduction gear ratio of 1/(Z+1) is obtained. For example, in a case of Z=49, a reduction gear ratio of 1/50 is obtained. In this way, a speed reduction mechanism incorporating the gear mechanism of the present invention exhibits high performance.

Note that, as a matter of course, when the first gear 3 and the second gear 4 are replaced with each other, the output is reversed, and a reduction gear ratio of −1/Z is obtained. Further, in this embodiment, preloads are applied to the bearings so as to increase rigidities thereof, and the gears are assembled with high accuracy so as to apply a certain preload between the gears. In this way, backlash is minimized, and rigidities of the gears are increased. In this case, bearings such as a roller bearing and a slide bearing may be employed as the bearing for each of the axes. Further, instead of the flexible joint mechanism illustrated above, there may be used various other couplings including a gimbal mechanism and universal joints such as a constant velocity joint.

Further, the speed reducer 10 described above may vibrate when the input shaft 2 is rotated at a high rpm. This is because a center of gravity of the rocking portion formed of the inclined shaft portion 26 of the input shaft 2, the bearing 61, and the second gear 4 is decentered from the input rotation axis 70 (displaced on the inclined rotation axis 71 from the reference point 72 in the right-hand direction of the drawing sheet). As a countermeasure, as illustrated, for example, in FIGS. 6A to 6D, it is appropriate to provide a counterweight or the like so as to set the center of gravity of the rocking portion to the position of the reference point 72 or at least on the input rotation axis 70.

Figure 6A:
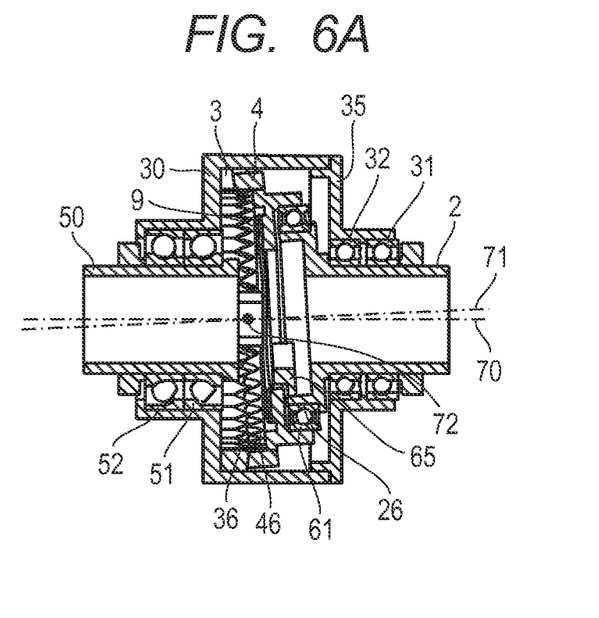
FIGS. 6A, 6B, 6C and 6D are explanatory views of other examples of the speed reducer according to the first embodiment.
Figure 6B:
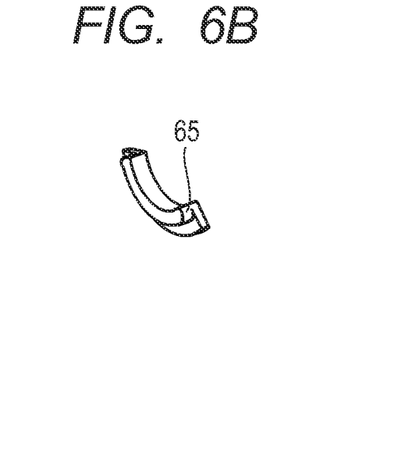
Figure 6C:
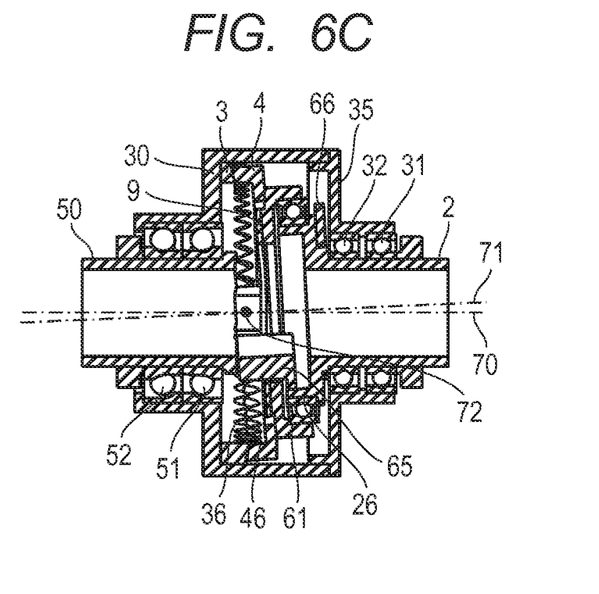
Figure 6D:
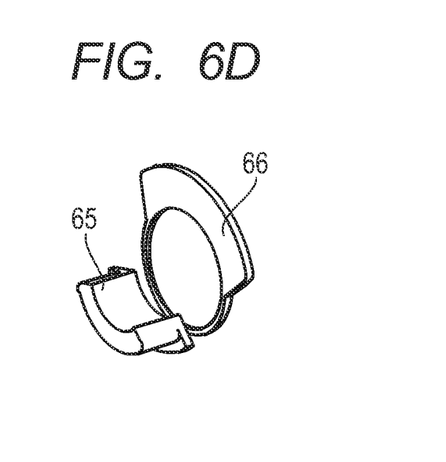

Specifically, FIGS. 6A and 6B illustrate an example in which a counterweight 65 is provided so as to set the center of gravity on the input rotation axis 70. As another method, there may be employed a gear mechanism illustrated by a spherical model described below in which an apex angle other than 180 degrees is formed as a result of a latitude offset so that the reference point 72 matches with the center of gravity of the rocking portion by being displaced in the right-hand direction of the drawing sheet. In this case, weight reduction and downsizing that are greater than those in a case of providing an extra counterweight can be performed. Further, FIGS. 6C and 6D illustrate an example of adding a second counterweight 66 in reverse phase so as to secure what is called a two-plane balanced state. In this case, vibration due to the rocking motion can also be suppressed, and hence a higher-speed rotation can be input.

Second Embodiment

Next, a robot device 500A according to a second embodiment of the present invention is described with reference to FIGS. 7A and 7B to FIGS. 11A and 11B as well as FIG. 1. The robot device 500A according to the second embodiment includes a speed reducer different from that of the first embodiment. Thus, in the second embodiment, a difference from the first embodiment, in other words, the speed reducer is mainly described, and the same other components as those in the first embodiment are denoted by the same reference symbols, and are not described.

As illustrated in FIG. 1, the robot device 500A includes an articulated robot 100A for performing the operations such as the assembly of the workpiece W, the control unit 200, and the teaching pendant 300. The articulated robot 100A includes a six-axis articulated robot arm 101A and the end effector 102, and the robot arm 101A includes the base portion 103, the multiple links 121 to 126, and the multiple joints 111 to 116. The multiple joints 111 to 116 each include the drive motor (not shown), the encoder (not shown), and a speed reducer 10A for reducing output of the drive motor so as to increase torque of the drive motor.

Figure 7A:
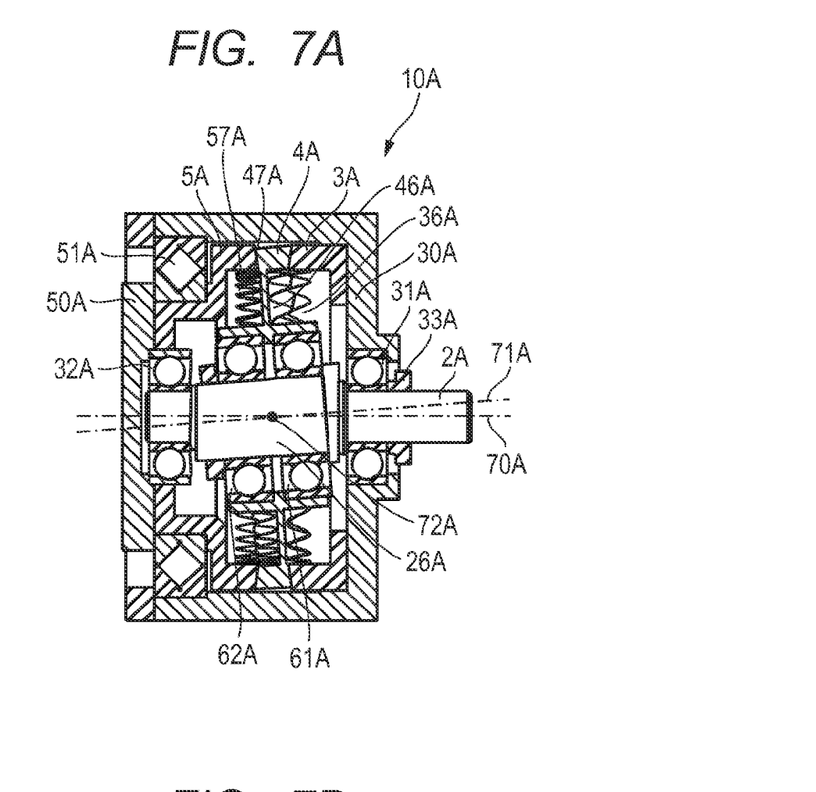
FIGS. 7A and 7B are explanatory views of a speed reducer according to a second embodiment of the present invention.
Figure 7B:
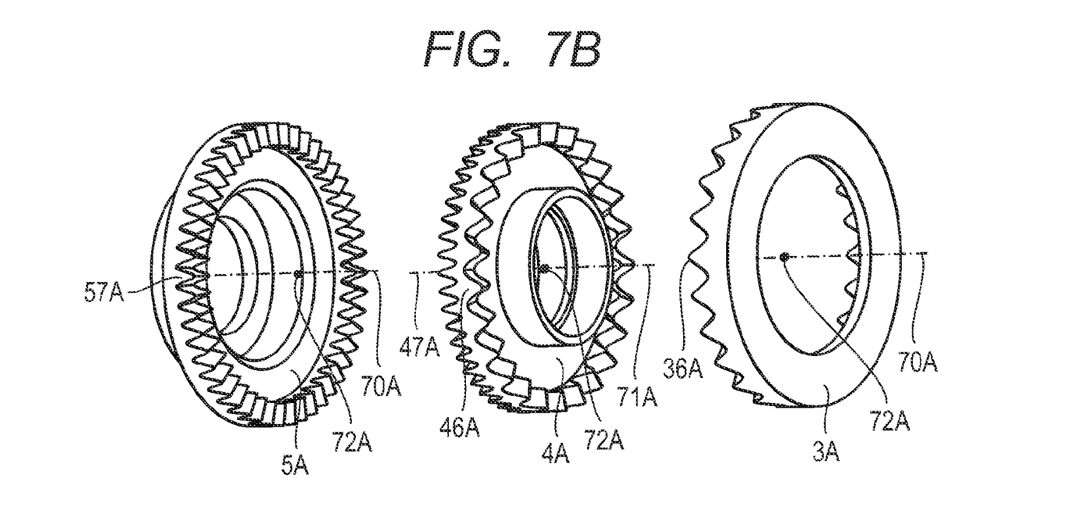
Figure 8A:
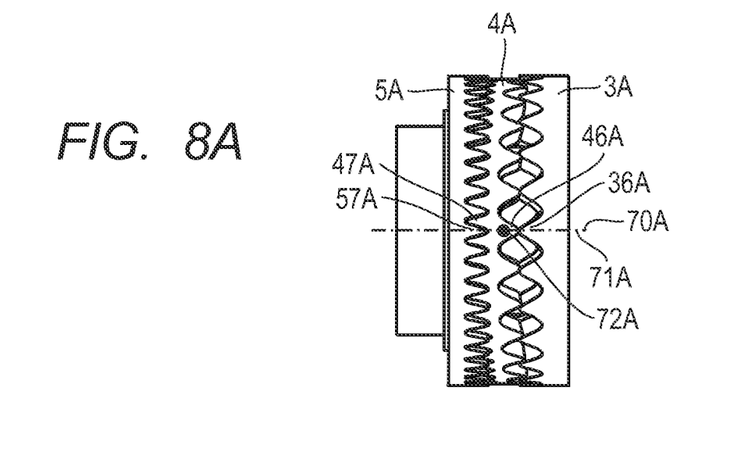
FIGS. 8A, 8B and 8C are views of a speed reduction gearing of the speed reducer according to the second, embodiment.
Figure 8B:
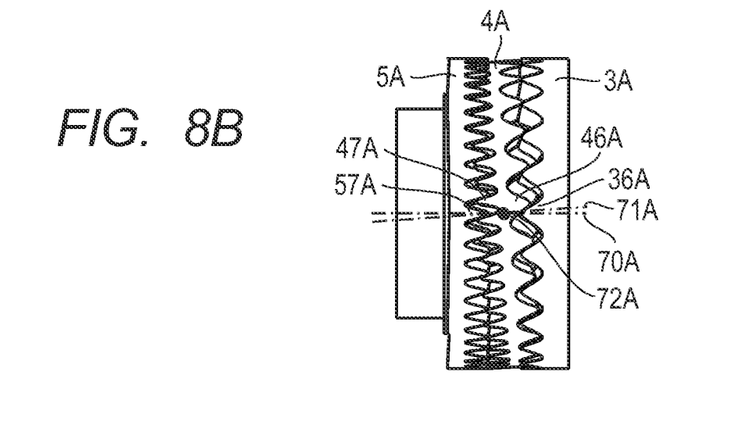
Figure 8C:
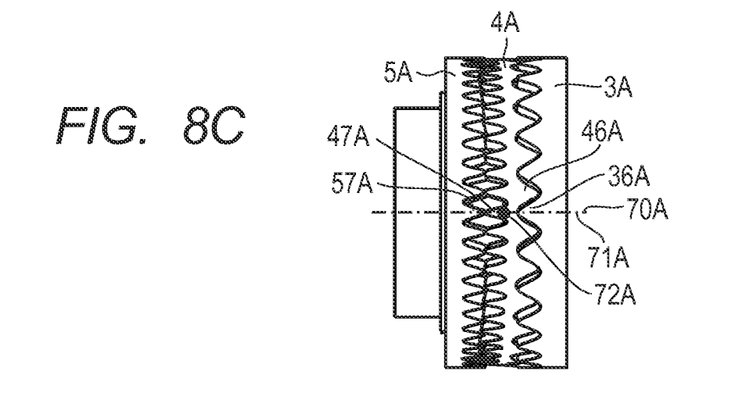

Next, the speed reducer 10A according to the second embodiment is described with reference to FIGS. 7A and 7B to FIGS. 11A and 11B. First, a schematic structure of the speed, reducer 10A is described with reference to FIGS. 7A and 7B and FIGS. 8A to 8C. FIGS. 7A and 7B are explanatory views of the speed reducer 10A according to the second embodiment. FIGS. 8A to 8C are views of a speed reduction gearing of the speed reducer 10A according to the second embodiment.

As illustrated in FIGS. 7A and 7B, a second gear 4A of the speed reducer 10A according to the second embodiment rocks in mesh with a fixed first gear 3A, and includes not only teeth 46A but also teeth 47A on an opposite side so as to mesh with a third gear 5A. Tooth profiles of those two pairs of the gear mechanisms correspond to tooth profiles of gear mechanisms in which latitude offsets are set so that a reference point 72A is shared. The numbers of teeth 36A, the teeth 46A, the teeth 47A, and teeth 57A are set respectively to Z1, Z1+1, Z2+1, and Z2.

The third gear 5A is coupled directly to an output shaft 50A, and supported in a pivotal manner by a cross roller bearing 51A having a high rigidity. In the second embodiment, latitude offsets of the two pairs of the gear mechanisms are set to be substantially equal to each other so that a center of gravity of a rocking portion formed of an inclined shaft portion 26A of the input shaft, bearings 61A and 62A, and the second gear 4A matches with the reference point 72A.

As illustrated in FIGS. 8A to 8C, meshing positions between the teeth 36A of the first gear 3A and the teeth 46A of the second gear 4A are out of phase with each other by a half pitch, and meshing positions between the teeth 47A of the second gear 4A and the teeth 57A of the third gear 5A are out of phase with each other by a half pitch. Thus, at a position illustrated in FIG. 8A, the tooth 36A of the first gear 3A and the tooth 46A of the second gear 4A are in-phase with each other, and distal ends of tooth tip portions thereof are held in contact with each other. Simultaneously, the tooth 47A of the second gear 4A and the tooth 57A of the third gear 5A mesh deeply with each other out of phase by a half pitch. Further, at a position illustrated in FIG. 8B, the tooth 36A of the first gear 3A and the tooth 46A of the second gear 4A loosely mesh with each other out of phase by a ¼ pitch, and the tooth 47A of the second gear 4A and the tooth 57A of the third gear 5A loosely mesh with each order out of phase by a ¼ pitch. Still further, at a position illustrated in FIG. 8C, the tooth 36A of the first gear 3A and the tooth 46A of the second gear 4A mesh deeply with each other out of phase by a half pitch. Simultaneously, the tooth 47A of the second gear 4A and the tooth 57A of the third gear 5A are in-phase with each other, and distal ends of tooth tip portions thereof are held in contact with each other.

In other phases therebetween, the teeth 36A and the teeth 46A, and the teeth 47A and the teeth 57A are changed in phase with each other, and hence changed in meshing depth. With this, the first gear 3A and the second gear 4A, and the second gear 4A and the third gear 5A are held in contact with each other substantially over the entire peripheries thereof.

Figure 9:
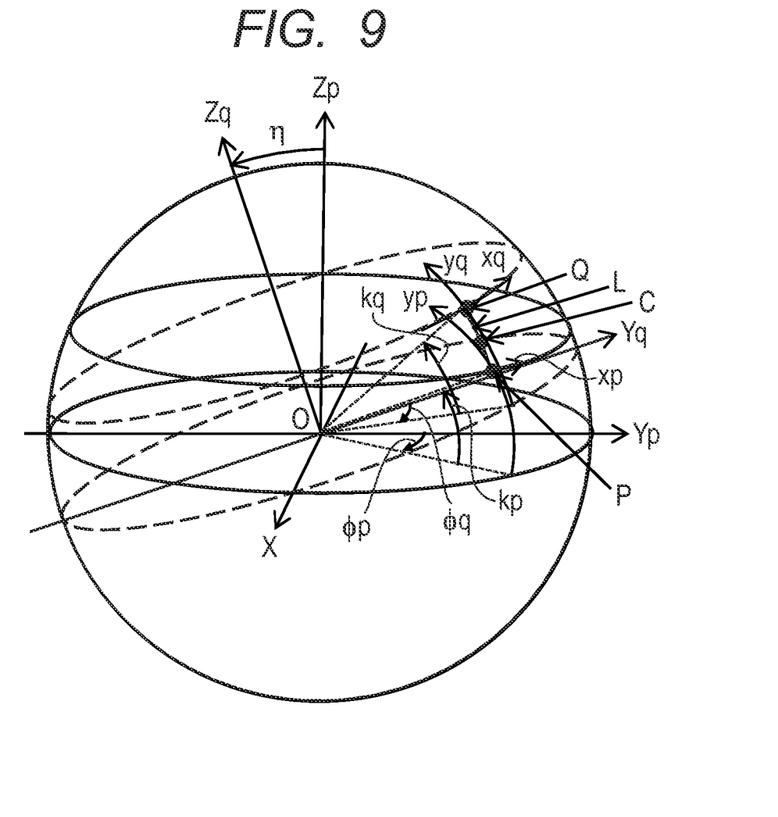
FIG. 9 is an explanatory view for calculating a projecting tooth profile curve of the speed reduction gearing.
Figure 10A:
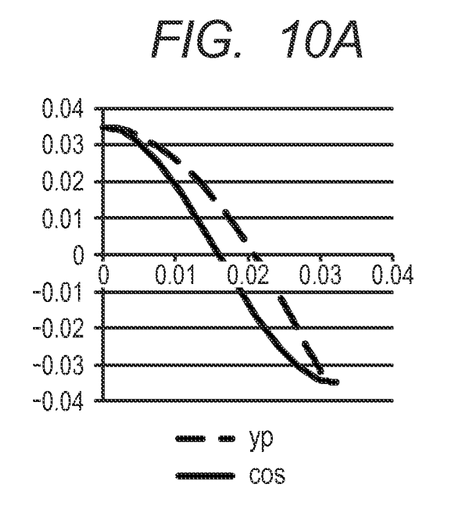
FIGS. 10A and 10B are graphs showing semicircular trajectories of a point C.
Figure 10B:
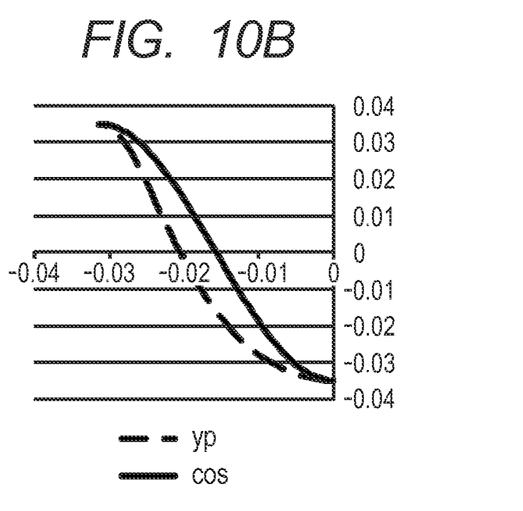

Now, a principle that the teeth 36A of the first gear 3A and the teeth 46A of the second gear 4A, and the teeth 47A of the second gear 4A and the teeth 57A of the third gear 5A are held in contact with each other substantially over the entire peripheries thereof is described with reference to FIG. 9 and FIGS. 10A and 10B. FIG. 9 is an explanatory view for calculating a projecting tooth profile curve of the speed reduction gearings FIGS. 10A and 10B are graphs showing semicircular trajectories of the point C.

As illustrated in FIG. 9, the Zp-axis corresponds to an input rotation axis 70A, and the Zq-axis corresponds to an inclined rotation axis 71A. The Zq-axis is inclined at the inclination angle η with respect to the Zp-axis, and the origin O corresponds to the reference point 72A. The common X-axis extends in the direction orthogonal to the plane including the Zp-axis and the Zq-axis. In this way, the X-Yp-Zp coordinate system and the X-Yq-Zq coordinate system are set. In the second embodiment, a sphere having the radius R about the origin O as a center is considered instead of the cylinders.

Next, the points P and Q (also referred to as tooth reference points) considered here uniformly move clockwise respectively from positive sides in a Yp-axis direction and an Yq-axis direction on small circles (also referred to as reference pitch circle) at latitude offset coordinates kp and kg with respect to the X-Yp plane and the X-Yq plane as respective equatorial planes of the coordinate systems. When the first gear 3A is provided with the Z teeth, and the second gear 4A is provided with Z+n teeth (n=1), longitude coordinates of the points P and Q can be expressed respectively by $\phi p = 2\pi t/Z$ and $\phi q = 2\pi t/(Z+1)$ (t: parameter).

In this case, the point C on a circular arc L on a large circle connecting the points P and Q to each other is set as a meshing point, and the trajectories of the point C in the xp-yp moving coordinate system and the xq-yq moving coordinate system with the points P and Q as origins in a spherical plane are calculated. As in the case of the cylindrical model described above, when the trajectory of the point C moves along the projection shape of each of the tooth tip portions in each of the moving coordinate systems, and tooth profile curves on a side on which the gears mesh with each other more deeply with respect to the meshing reference point each correspond to an external tangent (recessed shape) conforming to the trajectory along the projection shape of each of the tooth tip portions in each of the moving coordinate systems, tooth profiles to mesh with each other substantially over the entire peripheries thereof can be obtained. Also in the case of this spherical model, the gears mesh as illustrated in FIGS. 5A to 5E. Note that, the xp-yp moving coordinate system and the xq-yq moving coordinate system are in the same spherical plane, and hence an accurate solution can be obtained based not only on the circumscribed curved surface but also on the external tangent.

Note that, a specific tooth profile curve of the tooth tip portions cannot be expressed by simple expressions as those in the case of the cylindrical model described above, and hence is not described here for the sake of simplification of description. However, in order to obtain the specific tooth profile curve, it is only necessary to calculate coordinates of the point C and calculate differences between the coordinates of the point C and coordinates of the points P and Q. Here, an example of results of the calculation is described. FIGS. 10A and 10B show the semicircular trajectories of the point C in the xp-yp moving coordinate system and the xq-yq moving coordinate system in a case where the numbers of teeth Z and Z+1 are respectively 49 and 50, the inclination angle η is 4 degrees, and the latitude offset positions kp and kq are each −8 degrees. The respective abscissa, axes represent the xp-axis and the xq-axis, and the respective ordinate axes represent the yp-axis and the yq-axis in units of radians. Tooth profiles having tooth tips rather thicker (around 0 degrees) than those of the tooth profiles of cosine functions illustrated in an overlapped manner are obtained. Further, the point C is set as a middle point of the circular arc, and hence the tooth profiles of the two tooth tip portions are the same as each other, and each have a uniform strength. Alternatively, the point C may be set, for example, as an equal ratio dividing point so as to form different tooth profiles. For example, when the circular arc is divided at an inverse ratio of the numbers of teeth, similar tooth profiles can be formed.

As in the case of the cylindrical model, the meshing states shift as follows. In a direction of a longitude of 0 degrees, distal ends of tooth tips are held in contact with each other. Along with rotation, the projecting portions of the tooth tips mesh with each other at the meshing point 81. The projecting portions meshing with each other as illustrated in FIG. 5C in the direction of approximately ±90 degrees enter the meshing state as illustrated in FIG. 5D, in which the projecting portions mesh with each other at the contact points 83 and 84. In the direction of ±180 degrees, the projecting portions enter the deepest meshing state of FIG. 5E.

Note that, when the latitude offsets are set as described above, the tooth profile is somewhat thicker or thinner than the cosine tooth profile. Thus, the phase in which the one-point contact of FIG. 5C is switched to the two-point contact may be displaced by 10 degrees or more from the direction of 90 degrees. However, such cases are included in the definition of "near the position in the direction of 90 degrees (near the boundary position)" in the gist of the present invention.

In this way, the latitude offset can be set with the spherical model, and hence the gear having the apex angle other than 180 degrees can be provided. Thus, the gear mechanism according to the present invention, which has excellent performance, can be designed with a higher degree of freedom.

Figure 12:
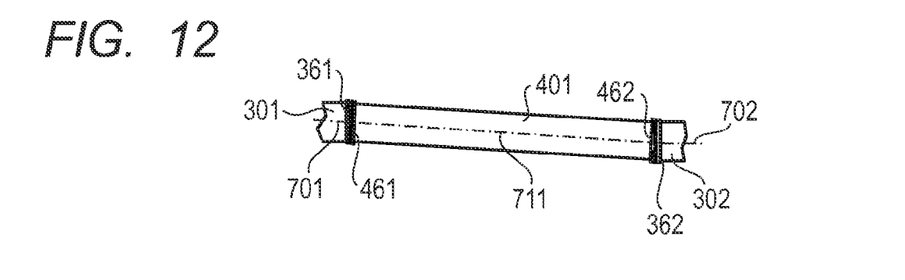
FIG. 12 is a view of a mechanical device using the gear mechanism according to the embodiments of the present invention.

Further, the gear mechanism of the present invention can be used while being incorporated in various mechanical devices such as a mechanism employing parallel offset arrangement as illustrated in FIG. 12, in which gear mechanisms 361 and 461 are provided between an input shaft 301 and an intermediate shaft 401, and gear mechanisms 362 and 462 are provided between the intermediate shaft 401 and an output shaft 302. When the gear mechanisms 361 and 461 and the gear mechanisms 362 and 462 have the same structure, the input shaft and the output shaft are parallel to each other and rotated at the same rpm. As a matter of course, when the input shaft and the output shaft are not parallel to each other or may be rotated at different rpms, it suffices that the present invention be applied in accordance with such design conditions. For example, when the gear mechanism of the present invention is used in a transmission mechanism for absorbing a difference in height of a shaft between an engine and a screw of a ship, the gear mechanism of the present invention is smaller in diameter than conventional gear mechanisms and universal joints, and hence space saving, weight reduction, and cost reduction, can be achieved.

Next, a speed reducing operation by the speed reducer 10A having the two pairs of the gear mechanisms described above is described with reference to FIGS. 7A and 7B and FIGS. 8A to 8C. First, when the input shaft 2A performs a single rotation, the second gear 4A performs a single rocking motion. At this time, the second gear 4A is revolved at $360/(Z1+1)$ degrees with respect to the fixed first gear 3A. Meanwhile, the third gear 5A and the second gear 4A are revolved by rocking. In other words, this structure is configured to transmit the revolution of the second gear 4A with a second gear mechanism. A reduction gear ratio obtained by the structure of this type can be represented by $1-(Z1(Z2+1))/((Z1+1)Z2)$. For example, in a case of Z1=24 and Z2=48, a reduction gear ratio of 1/50 is obtained. Alternatively, for example, in a case of Z1=48 and Z2=49, a high reduction gear ratio of 1/2401 can be obtained. The speed reducer of this type can provide, in a single step, a wide range of reduction gear ratios from a low reduction gear ratio of approximately 1/20 to a high reduction gear ratio of one several thousandths.

In this embodiment, latitude offsets of the two pairs of the gear mechanisms are set to be substantially equal to each other so that the center of gravity of the rocking portion formed of the inclined shaft portion 26A of the input shaft, the bearings 61A and 62A, and the second gear 4A can be easily matched with the reference point 72A. Thus, even without use of a counterweight or the like, the gear mechanism of this embodiment is applicable to use at a high input rpm.

Figure 11A:
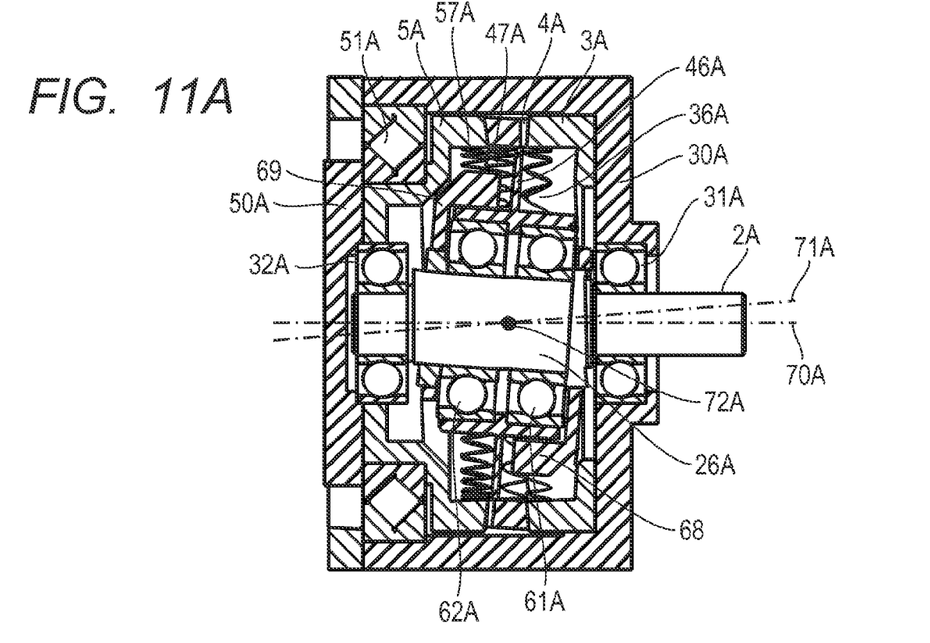
FIGS. 11A and 11B are explanatory views of another example of the speed reducer according to the second, embodiment.
Figure 11B:
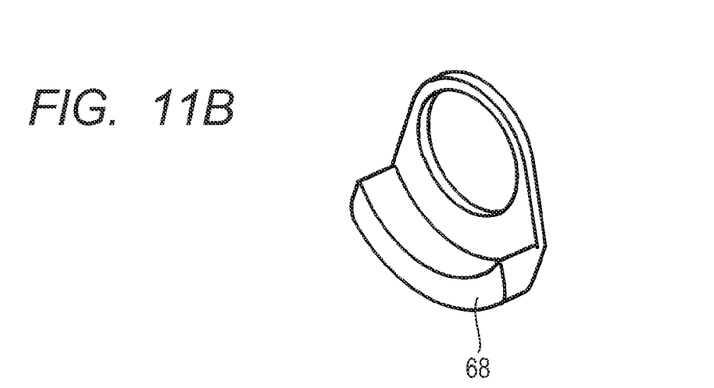

At the time of use at high speed, specifically, at several thousands of rpm, the balance between the two planes needs to be corrected. FIGS. 11A and 11B illustrate a speed reducer provided with two counterweights 68 and 69 each having substantially the same shape so as to secure the two-plane balanced state. With this, vibration can be minimized even in use at high speed, and lives of bearings 31A and 32A of the input shaft can be prolonged.

Further, as illustrated in FIG. 7B, the first gear 3A and the third gear 5A are each formed to have a high rigidity, and meanwhile, the second gear 4A includes a thin flange provided to an inner peripheral portion of the tooth portion having a high rigidity. With this, errors between the teeth in the case of applying the preloads by sandwiching the second gear 4A with the first gear 3A and the third gear 5A can be absorbed with deformation of the flange portion. In other words, in this embodiment, flexibility can be imparted in this way in accordance with a requisite rigidity of the speed reducer.

Further, as illustrated in FIGS. 8A to 8C, the two pairs of the gear mechanisms mesh with each other over the entire peripheries thereof, and the torque applied to the third gear 5A is transmitted in-phase directly to the teeth 36A of the first gear 3A through intermediation of the teeth 57A and the teeth 47A and 46A in the stated order. Thus, it is understood that a markedly high rigidity can be obtained. Note that, the markedly high rigidity can be obtained not only in the case where the numbers of the teeth 36A, the teeth 46A, the teeth 47A, and the teeth 57A are set respectively to Z1, Z1+1, Z2+1, and Z2 as in this embodiment so as to perform forward rotation differential output, but also in a case where the numbers of the teeth 36A, the teeth 46A, the teeth 47A, and the teeth 57A are set respectively to Z1+1, Z1, Z2, and Z2+1 so as to perform reverse rotation differential output.

Alternatively, when the numbers of the teeth 36A, the teeth 46A, the teeth 47A, and the teeth 57A are set respectively to Z1, Z1+1, Z2, and Z2+1, a revolution angle is added instead of an amount of differential motions. In this case, the reduction gear ratio cannot be sufficiently increased, and the torque applied to the third gear 5A is transmitted from the teeth 57A to the teeth 36A in reverse phase. Thus, a rigidity as high as that in the case of adding the amount of the differential motions cannot be obtained. However, the gear mechanism of this embodiment is applicable to a speed reducer that provides a relative low reduction gear ratio and has a relatively high load capacity. Further, a crowning process and the like for reducing partial contact due to errors of the tooth profiles and assembly errors are effective also to the tooth profiles according to this embodiment.

In the gear mechanisms according to the embodiments of the present invention, torque can be shared by the large number of teeth. Thus, for example, when a high performance steel is used as a material for the gears, a high performance speed reducer can be provided. Note that, the material for the gears may be not only low cost general steels, but also, as a matter of course, non-ferrous metals, sintered materials, and resins.

As described above, according to the embodiments of the present invention, the projection surface-like tooth tip portions of at least one of the two gears continuously mesh with the tooth profile of the mating recessed portions on the tooth root side. Thus, the large number of teeth mesh with each other within a range of from the reference phase to the phase in the direction of approximately ±90 degrees. Further, the pressure angle at the meshing reference point can be freely set in accordance with the numbers of the teeth and the inclination angle, and hence a load capacity can be markedly increased. In addition, efficiency can be improved at an appropriate pressure angle. Still further, errors of the tooth profiles can be equalized, and hence rotational accuracy can be enhanced. In addition, processes can be performed with a tool having a shape of the tooth profile of the projection surface-like tooth tip portions, and hence the tooth profile can be easily obtained and processed.

Yet further, by setting a substantially equal tooth thickness of the projection surface-like tooth profile of the tooth tip portions, the teeth to mesh with each other have substantially the same profile on each side, and hence strength can be secured. Further, by setting different apex angles of reference conical planes of the two gears, a positional relationship between an intersection of the axes and tooth surfaces of the two gears can be freely changed, and hence the degree of freedom of design is enhanced.

Yet further, with use of the speed reducer including the two pairs (at least one pair) of the gear mechanisms (oscillating gearings), the large number of teeth are meshed with each other, and hence the above-mentioned advantages can be obtained. As a result, a speed reducer that is high in rigidity and torque capacity and small in size and weight can be provided. In addition, when two pairs of the gear mechanisms according to the first embodiment are used in the gear mechanism formed of the second gear having both end surfaces that mesh respectively with the first gear and the third gear so as to rock and rotate, a speed reducer that is higher in rigidity and torque capacity and smaller in size and weight can be provided.

Note that, the speed reducer 10A in the case described in the second embodiment includes the two pairs of gear mechanisms. However, the present invention is not limited thereto. For example, the speed reducer may be a speed reducer including at least one pair of gear mechanisms.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-210920, filed Sep. 25, 2012, which is hereby incorporated by reference herein in its entirety.

REFERENCE SIGNS LIST 3, 3A first gear
4, 4A second gear
10, 10A speed reducer
36 tooth
36a tooth tip portion
36b recessed portion
46 tooth
46a tooth tip portion
46b recessed portion
101, 101A robot arm
500, 500A robot device
n difference in number of teeth

The invention claimed is:
1. A gear mechanism, comprising:
a first gear having an annular tooth surface comprising:
    multiple tooth tip portions formed on a distal end side with respect to a predetermined height; and
    multiple recessed portions formed on a tooth root side with respect to the predetermined height at positions between the multiple tooth tip portions, respectively; and
a second gear having an annular tooth surface comprising:
    multiple tooth tip portions formed on a distal end side with respect to the predetermined height; and
    multiple recessed portions formed on a tooth root side with respect to the predetermined height at positions between the multiple tooth tip portions, respectively,
    the multiple tooth tip portions of the second gear and the multiple recessed portions of the second gear being respectively larger in number than the multiple tooth tip portions of the first gear and the multiple recessed portions of the first gear, wherein the first gear and the second gear are arranged under a state in which a rotation axis of the first gear and a rotation axis of the second gear are inclined at a predetermined angle so as to set a deepest meshing position at which one of the multiple tooth tip portions of one of the first gear and the second gear and corresponding one of the multiple recessed portions of another of the first gear and the second gear mesh most deeply with each other, and a grazing position at which the one of the multiple tooth tip portions of the one of the first gear and the second gear and corresponding one of the multiple tooth tip portions of the another of the first gear and the second gear graze each other on an opposite side of the deepest meshing position, and to form a first meshing region in which the one of the multiple tooth tip portions of the one of the first gear and the second gear and the corresponding one of the multiple tooth tip portions of the another of the first gear and the second gear are held in contact with each other on each of both sides of the grazing position, and a second meshing region in which the one of the multiple tooth tip portions of the one of the first gear and the second gear and the corresponding one of the multiple recessed portions of the another of the first gear and the second gear are held in contact with each other on the deepest meshing position side with respect to the first meshing region, wherein the multiple tooth tip portions of the first gear and the multiple tooth tip portions of the second gear are each formed to be held in contact with each other at one point in the first meshing region, and wherein the multiple recessed portions of the first gear and the multiple recessed portions of the second gear are each formed to conform to a passing region extending along movement of one of the multiple mating tooth tip portions at the time of moving in the second meshing region.

2. A gear mechanism according to claim 1, wherein the multiple tooth tip portions of the first gear and the multiple tooth tip portions of the second gear are each formed based on the following expressions assuming an X-Yp-Zp coordinate system and an X-Yq-Zq coordinate system including:

a Zp-axis corresponding to a rotation axis of the first gear;
a Zq-axis corresponding to a rotation axis of the second gear;
an origin O corresponding to an intersection between the Zp-axis and the Zq-axis;
a common X-axis orthogonal to a plane including the Zp-axis and the Zq-axis;
a Yp-axis orthogonal to the Zp-axis and the common X-axis; and
a Yq-axis orthogonal to the Zq-axis and the common X-axis, $$yp = R \tan(\eta/2)\cos(xpZ) \text{ and } yq = -R \tan(\eta/2)\cos(xq(Z+n))$$

where R represents a radius of each of the first gear and the second gear, $\eta$ represents an inclination angle of the Zq-axis with respect to the Zp-axis, Z represents a number of teeth of the first gear, and Z+n represents a number of teeth of the second gear.

3. A gear mechanism according to claim 2, wherein the multiple tooth tip portions of the first gear and the multiple tooth tip portions of the second gear are formed to have respective distal ends that are held in contact with each other at the grazing position.

4. A gear mechanism according to claim 2, wherein the multiple tooth tip portions of the first gear and the multiple tooth tip portions of the second gear are trimmed to have respective distal ends that are out of contact with each other at the grazing position.

5. A gear mechanism according to claim 2, wherein a difference n in number of teeth between the first gear and the second gear is one of one and two.

6. A speed reducer, comprising at least one pair of the gear mechanisms according to claim 1, the speed reducer being configured to output an input rotation at a lower speed.

7. An articulated robot arm, comprising:
at least one joint; and
an actuator comprising:
 a drive motor; and
 the speed reducer according to claim 6, which is connected to the drive motor,
 the actuator being mounted to the at least one joint.

* * * * *